United States Patent
Zelikov

(10) Patent No.: US 11,377,016 B2
(45) Date of Patent: Jul. 5, 2022

(54) METHOD OF OIL PRODUCT RECEIPT AND METERING

(71) Applicant: Vladimir Viktor Zelikov, Stockholm (SE)

(72) Inventor: Vladimir Viktor Zelikov, Stockholm (SE)

( * ) Notice: Subject to any disclaimer, the term of this patent is extended or adjusted under 35 U.S.C. 154(b) by 0 days.

(21) Appl. No.: 17/268,726

(22) PCT Filed: Aug. 16, 2019

(86) PCT No.: PCT/EP2019/072000
§ 371 (c)(1),
(2) Date: Feb. 16, 2021

(87) PCT Pub. No.: WO2020/035589
PCT Pub. Date: Feb. 20, 2020

(65) Prior Publication Data
US 2021/0291716 A1    Sep. 23, 2021

(30) Foreign Application Priority Data
Aug. 16, 2018   (RU) ............................ RU2018129869

(51) Int. Cl.
*B67D 7/16*   (2010.01)
*G01F 7/00*   (2006.01)
*B60P 3/22*   (2006.01)

(52) U.S. Cl.
CPC ............... *B60P 3/228* (2013.01); *B67D 7/16* (2013.01); *G01F 7/00* (2013.01)

(58) Field of Classification Search
CPC .................................... G01F 7/00; B67D 7/16
See application file for complete search history.

(56) References Cited

U.S. PATENT DOCUMENTS

| 5,821,406 A | 10/1998 | Ridgeway et al. |
| 2013/0126553 A1* | 5/2013 | Williams ............... G01F 7/00 222/71 |
| 2019/0100425 A1* | 4/2019 | Paar ...................... B67D 7/348 |

FOREIGN PATENT DOCUMENTS

| DE | 102006001866 A1 | 7/2007 |
| EP | 1971547 A1 * | 9/2008 ............... B67D 7/22 |

OTHER PUBLICATIONS

International Preliminary Report on Patentability for PCT Application No. PCT/EP2019/072000 dated Feb. 16, 2021.

(Continued)

*Primary Examiner* — Jason K Niesz
(74) *Attorney, Agent, or Firm* — Branch Partners PLLC; Bruce E. Black

(57) ABSTRACT

The invention comprises a main and a subsequent stage. At the main stage, the medium is pumped into a first instrument line. This first instrument line is mounted in a main pipeline system and is equipped with an inlet mass meter with a first flow rate range. After reaching of a set value from the instruments, an automated control system (ACS) stops the first line pump, ensures operation of its driving isolation valves, thus, completing the main stage measurement cycle, and switches the system into the subsequent stage mode. At the subsequent stage, the medium flow is collected from the tank and cavities of the measuring system. It flows by gravity into the bottom of the system inner volume (9) and is then supplied by a to a second instrument line equipped by a mass meter with a second and lower flow rate range.

20 Claims, 2 Drawing Sheets

(56) References Cited

OTHER PUBLICATIONS

International Search Report for PCT Application No. PCT/EP2019/072000 dated Nov. 5, 2019.
Written Opinion for PCT Application No. PCT/EP2019/072000 dated Nov. 5, 2019.
International Search Report for PCT Application No. PCT/EP2019/07200 dated Nov. 5, 2019.

* cited by examiner

METHOD OF OIL PRODUCT RECEIPT AND METERING

CROSS-REFERENCE TO RELATED APPLICATIONS

This present application is a U.S. national stage application of PCT Application No. PCT/EP2019/072000, filed Aug. 16, 2019, which claims priority to Russian Patent Application No. 2018129869 filed Aug. 16, 2018, both of which are hereby incorporated by reference in their entirety.

FIELD OF THE INVENTION

The invention relates to methods of transfer and metering of oil products and other liquids with low pressure of saturated vapors discharged from rail tank cars (hereinafter referred to as the "RTC"), road tank cars and other tanks, and namely, to a dynamic method of fuel mass measurement with minimum measurement error and high reliability of such measurement, in particular, at complete draining of tanks from the mediums transported in them.

BACKGROUND

There are the following methods of oil product metering complying with International recommendation OIML R 117-1, Edition 2007 E and COST R 8.595-2002:
  The direct static method where the commodity mass is determined as the calculated difference between the mass of an empty and a loaded rail car tank weighed on a static scale before and after loading, for example, when on-spot loading units are used in an oil refinery.
  The direct dynamic method where the mass is determined directly during loading using mass meters of filling units, for example, on the gallery-type load racks;
  The indirect static method where the fuel mass is calculated by multiplication of the standard volume and density values.
  The maximum standard allowable error for the specified methods is defined, for example, in Russia, as 0.25%.
  Now, the indirect static method is the most common both for shipping operations and for fuel receipt. The volume is determined according to the reduction tables using manual level and temperature measurements and stated in the calibrated RTC as capacity measure, and the standard density is determined in the laboratory by the analysis of the samples from the RTC. This procedure is also performed manually. As a result, the maximum allowable standard error of the fuel mass determination is specified, for example, in Russia, as 0.65%.
  Herewith, at all stages, from measurements to calculations and execution of turnover documentation, there are some risks stipulated by possible mistakes of different groups of the engaged personnel performing discharge operations, measuring quantity in the unloading area, performing sample analysis in the laboratory and executing logs, calculations and reports.
  Besides, the error is always interpreted in favor of seller, and thus, low accuracy increases the customer's losses. Thus, the customer without its own certified metering system has to pay bills not for commodity actually delivered but for the data in the ready documents which are often prepared according to the data of manual measurements.

SUMMARY OF THE INVENTION

The invention solves the following technical difficulties:
  Several liters of undefined medium residuals are always left in the process equipment of the measuring systems (MS), and the minimum measured quantity (or MMQ, according to OIML R117-1:2007 E) of the medium is expressed in tons in this case;
  The mass of the specified residuals can be calculated using the calibrated volume, level and density, or it can be determined by static weighing of the residuals, or the additional error can be estimated through other means, that is not always metrological appropriate as all received batch cannot be considered as satisfying the requirements of the direct dynamic mass recording. Also, in this case, the whole measuring system will not satisfy the principle of used method unanimity for metering of all fuel batches.
  The volume of liquid in the tank is not known in advance. The tank may be tilted; oil may cool down on the walls or have residuals of water absorbing mechanical impurities or paraffin's on the bottom which are not always removed at oil unloading. The invention is used for metering of the mass actually received by the customer.
  The minimum fuel quantity measured by the commercially available systems is expressed by tons. This means that the portion with the mass of less than one ton formed due to interruption of the RTC metering, for example, because of filter clogging, cannot be measured further with the required accuracy and then, it is necessary to consider the whole metering operation for this RTC as rejected. If the invention is used, the minimum measured quantity is reduced by one or two orders, herewith, the risk of rejection is greatly reduced during the whole metering operation for full discharge of the product from the tank.
  The RTC with defective discharge device cannot be always fully unloaded. Also, the residuals metering is not always adjusted. In this case, the problem of the exact fuel metering is especially complicated by the increased risk of the two-phase flow formed in the downpipe at fuel unloading through the top manway, as drop of the liquid pressure at its lifting results in break of its aggregate state and boiling with formation of gas vapor bubbles which prevent normal operation of the pump and the mass meter (the flow rate meter), and the measuring system in a whole.

When a properly functioning tank is unloaded by the normal method through the bottom unloading device in hot weather, the flow is interrupted easily due to the high pressure differential on the mass meter with the nominal diameter of 80-150 mm and disturbs the standard measurement. The gas bubbles of the medium vapors formed at this interruption complicate significantly the usage of the mass meters at the back pressure drop in the measuring systems using Coriolis mass meters with control valve mounted right after the mass meter. The risk of rejected measurements is rather high even when the modern valve control systems and software are used in the measuring systems (MS) which are able to apply several consequential duty cycles of the instrument line (IL) and to perform fuel quantity measurement by stages with the following summing up of the portions taken from the RTC. That's why the mass meters are not adopted widely for the fuel filling systems, although they are commonly used in the fuel unloading systems.

Another problem is the following: if less than 1-2 tons of product is left in the tank bottom after each failure of the instrument line, then resuming of the automated measurement by the standard system is inappropriate and it is necessary to use the same methods of residuals metering as at "upper" discharge through the manway. In this case, the measurement of the whole received medium quantity may be considered as inaccurate.

The above mentioned problems are solved in the presented invention through implementation of a measuring system comprising two parallel lines with different capacity for oil metering. At that, the first instrument line is the critical one for the general unloading and metering mode and has a first flow rate range, and the second instrument line representing the key solution at the finishing and stripping stage (hereinafter referred to as the "finishing stage") has a second flow rate range and a metrological characteristic value ("the minimum possible medium quantity") which is one or two orders less than the first one. At that, the first and the second instrument lines are not interchangeable, as reduction of the minimum allowable measured quantity of medium is determined by the technological need to reduce capacity of each instrument line and also by fuel peculiarities due to the fact that the smaller diameter decreases the risks associated with formation of gas vapor bubbles in the medium flow down to the level ensuring reliable measurement of its residuals.

The technical result of the invention's solution is the following:

Implementation of the dynamic mass measurements with the minimum error to comply with type approval for measuring systems Class 0.3 and 0.5 in accordance with International recommendation OIML R 117-1, Edition 2007 (E) and also to comply with API MPMS Chapter 14.7

Assurance of mass metering reliability for the oil products received from tank at full unloading which cannot be obtained in other systems, both due to decrease of the minimum measured product quantity and decrease of the oil product collection speed at the subsequent stage.

The offered method not only improves accuracy but also ensures continuous pumping of residuals. At the subsequent stage, the fuel flows by gravity from the tank walls and the pipes to the bottom of the system inner volume (9) and does not contain a significant gas volume fraction. When pumping is performed from the bottom of the system inner volume (9) with low flow rate through the instrument line with the small diameter, the bubbles of the gas volume fraction are not formed in critical number, and the subsequent stage comprising one or several cycles is performed in the standard mode in the most reliable way.

Thus, the declared technical result is provided by a two stage method and by pumping and fuel metering which includes the main and the subsequent stage. The stages are differing by the method of medium extraction from the tank. At the main stage, the medium is extracted by the pump from a pipe connected to the tank and is pumped under pressure into the first instrument line. This first, or main, instrument line is mounted in the pipeline system with a base diameter and equipped with an inlet mass meter with the first flow rate range. After reaching a set values according to the instruments installed in the first line, an automated control system (ACS) stops the first line pump and ensures operation of its isolation valves, thus, completing the main stage measurement cycle. Then, the ACS switches the system into the subsequent stage mode. At the subsequent stage, the medium flow is collected from the tank and the body cavities of the measuring system. It flows by gravity into the bottom of the system inner volume (9) and then supplied by the pump with low capacity from the bottom of the system inner volume (9) into the second instrument line, the flow rate and the minimum possible measured medium quantity of which is one-two order less than in the main line. The second instrument line is equipped with a mass meter with the second flow rate range. It collects and measures the medium residuals in at least one step, then, upon command of the automated control system, it performs the next one; and when the number of medium collection and measurement cycles reaches the value set in the automated control system, the line and the whole system operation is stopped.

Both instrument lines are equipped with devices for medium mass measurement in real time (in flow), temperature and pressure sensors, control valves for flow conditioning by the medium back pressure ("return pressure") and with a computing device calculating the mass of the measured medium.

Thus, the principle of the invention involves sequential application of both lines, thus ensuring much more reliable mass measurements of all batches with the specified minimum error. The first line finishes its work after withdrawal of the basic medium mass from the tank; the pipelines of this first line are fully disconnected or switched off from the external pipelines. After that, the second line is switched on; it collects almost completely the medium which flows by gravity to the bottom of the system inner volume (9). The second line specifies the characteristic which is important for the whole system and is called as the minimum possible measured quantity; if this characteristic is low, there is a high probability of resuming of metrological important measurements which will be performed in several stages. This reduces the risk of measurement of all medium quantity at full discharge of the tank.

The recommended values for the first lines are: DN 50-125 mm (DN 2"-5"), the second DN 6-20 mm (DN ¼"-⅘") in case of a rail tank car discharge. For unloading of tankers and special tanks (including liquefied natural gas, LNG/LPG)—the first line DN 100-400 mm (DN 4"-16"), the second DN 6-50 mm (DN ¼-2").

The invention is suitable for all types of flow rate meters including Coriolis, ultrasonic, fluidic, turbine, direct volume displacement and magnetic displacement meters.

As the second line has pipelines of smaller diameter compared to the pipes of the first line, this reduces risk of formation of gas vapor bubbles which can result in mass meter malfunction according to the operational experience. Hence, application of the second line ensures performance of metrological important measurements for each measurement cycle which may be necessary for measurement of the whole medium from the tank delivered for unloading. If metrological importance and validity of each measurement is confirmed by the computing device of the system, summing up of all measurements by this device forms the medium mass properly metered at its receipt due to full discharge of the medium from the tank including by gravity at the subsequent stage.

In other words, after collection from the tank and measurement of the basic medium volume in the first instrument line with the specified accuracy (the main mode), the final collection of the medium is performed with measurement of its residuals in one or several stages using the second instrument line (the subsequent stage) which is also cleans the pipelines and cavities of the measuring system itself, thus, preparing it to receipt of the next tank delivered for unloading. The volume of collected and measured medium is calculated by summing up of all measured and metrological important medium portions; the general accuracy of the system from two lines is generally determined by the accuracy of the first line in the general mode. Full collection of the medium residuals from the bottom of the system inner volume (9) and measurement of this quantity by the second line allows to reduce the minimum possible measured quantity by two orders at least as compared with the technology level.

A further important effect of this invention is that the probability of an accurate whole batch measurement after a resumed measurement after fault increases greatly with the following summing up, when each sum should be more than the minimum possible measured quantity, only when the sum forms the metrological significant result. This is especially important for unloading RTCs and road tank cars.

The operation of the system components is in one embodiment controlled by an automated control system (ACS).

In a first aspect there is provided a method of measuring a liquid medium with low pressure of saturated vapors when pumped out of a tank (1), said method comprising at least one main stage and at least one subsequent stage, a main stage is followed by a subsequent stage; the main stage comprises using a first line pump (4) to pump out the medium from the tank (1) and in a first instrument line (Fa, Ta, ρa) equipped with a mass meter with a first flow rate range, the subsequent stage is initiated by the first line pump (4) being stopped, whereby the system enters the subsequent stage, during the subsequent stage the medium remnants are collected from the tank (1) and inner cavities of the first instrument line (Fa, Ta, ρa) into the bottom of the system inner volume (9) by gravity; and from the bottom point of the bottom of the system inner volume (9), the medium is supplied by a second pump (12) into a second instrument line (Fb, Tb, ρb), equipped with a mass meter, the mass-measuring capacity of the second instrument line (Fb, Tb, ρb) is at least one order of magnitude less than that of the first instrument line (Fa, Ta, ρa), when the number of performed main stages and subsequent stages reaches a predefined value or another condition is met, the measurement result is calculated by summing all medium masses from all main stages and subsequent stages.

In one embodiment the method is implemented in an automatic control system (ACS) adapted to control the device where the method is performed.

The procedure can be stopped at different conditions. First the subsequent stage is entered and then the subsequent stage is finished by summing up the measurement results. One obvious condition is that the tank (1) is empty but there are also other reasons. In one embodiment a command to enter the subsequent stage and also to finish the next subsequent stage is given when an interruption of liquid flow is registered by probe readings corresponding to an empty pipeline at the pump suction of the corresponding line. In one embodiment a command to enter the subsequent stage and also to finish the next subsequent stage is given when filter clogging is determined by exceeded limits of the differential pressure sensor at a filter. In one embodiment a command to enter the subsequent stage and also to finish the next subsequent stage is given when currently active mass meter readings correspond to a level of the bubbles in the medium above a predefined value. In one embodiment a command to enter the subsequent stage and also to finish the next subsequent stage is given if a diagnostic error occurs any of the instrument lines. In one embodiment a command to enter the subsequent stage is determined by the requirement not to exceed a certain value of the current load on an excitation coil of a mass meter sensor of the first instrument line. In one embodiment a command to inter the subsequent stage and to finish the subsequent stage is given when at least one of the above conditions is met.

In one embodiment the medium drains into the bottom of the system inner volume (9) from the tank (1), and from the first instrument line (Fa, Ta, ρa) wherein pipes supply the medium to the second pump (12).

In one embodiment the remnants supplied from the tank (1) bottom, discharge devices, filters, from a gas separator bottom, from pumps (4, 12), the first instrument line (Fa, Ta, ρa) and the internal system cavities are discharged into the bottom of the system inner volume (9), pumped out and metered in the subsequent mode.

In one embodiment the discharge is performed through a bottom discharge device of the tank (1) or the tank bottom point.

In one embodiment the flow is conditioned and all mass meters are kept operated in the mode selected according to the rated values of the used mass meter type corresponding to the lowest measurement error during pumping.

In one embodiment the flow is conditioned during pumping out by the main (2) and/or the subsequent line (11) using the standard control valve forming the medium back pressure (return pressure).

In one embodiment the flow is conditioned during pumping out by the main (2) and/or the subsequent instrument line (11) using treatment of the medium flow under pressure by gas separators which maintain the liquid phase state.

In one embodiment Coriolis flow rate meters are used, wherein the flow rate meter for the subsequent stage has at least one order of magnitude less capacity than the capacity of the flow rate used at the main stage.

In one embodiment the flow rate meter used at the main and subsequent stage is at least one selected from the group consisting of Coriolis, ultrasonic, fluidic, turbine, direct volume displacement and magnetic displacement flow meters, wherein, the flow rate meter for the subsequent stage has at least one order of magnitude less capacity than the capacity of the flow rate used at the main stage.

In one embodiment the main and the subsequent instrument lines perform pumping out and measurement of a medium quantity unknown in advance in a fully automated mode.

In one embodiment the main and the subsequent instrument lines perform pumping out of the metered product quantity as determined by on operator.

In one embodiment the second instrument line (Fb, Tb, ρb), has a mass-measuring capacity which is at least two orders of magnitude less than that of the first instrument line (Fa, Ta, ρa).

In a second aspect there is provided a system for measuring a liquid medium with low pressure of saturated vapors, the system comprising a tank (1), a main pipe (2), a first line pump (4), a first instrument line (Fa, Ta, ρa) equipped with a mass meter, a bottom of the system inner volume (9), a second pump (12), a second instrument line (Fb, Tb, ρb) equipped with a mass meter, and a subsequent pipe (11), wherein the mass measuring capacity of the first instrument line (Fa, Ta, ρa) is at least one order of magnitude larger than the mass measuring capacity of the second instrument line (Fb, Tb, ρb), wherein the main pipe (2), the first line pump (4), and the first instrument line (Fa, Ta, ρa) forms a first serial fluid connection (A) from the tank (1) to a destination for the liquid (13), wherein the bottom of the system inner volume (9), the second pump (12), the second instrument line (Fb, Tb, ρb), and the subsequent pipe (11) form a second serial fluid connection (B) from the first serial fluid connection (A) to the destination for the liquid (13).

In one embodiment of the second aspect the bottom of the system inner volume (9) is placed below the first fluid connection (A). Thereby the liquid in the part of the system denoted A, can flow by gravity to the bottom of the system inner volume (9), from where it can be pumped with the second pump (12) and measured in the second instrument line before it is pumped to the destination for the liquid (13).

The main and the subsequent instrumentation lines are not interchangeable, as they have different medium flow rates implemented by application of different process pipelines with different capacity. Both instrument lines of the system (hereinafter marked by components and in the description as "A" and "B") have the same structure, operating principle, equipment configuration and relative measurement error. A and B lines differ only by the operating range. Accordingly, the flow rate of the A line exceeds the flow rate of B line by 50-100 times in one embodiment, and the absolute values of the nominal error and the minimum of the measured quantity are 50-100 times less for B line. Decrease of the minimum measured quantity determined for the whole system by B line characteristics reduces significantly the risks of non-fulfilment (rejection) of mass metering for all delivered medium during the full tank unloading.

In the special case of invention implementation, RTCs are unloaded through the top manway (man hole). At that, the device standard for all such systems is used providing the medium conditioning by treatment of the medium flow under pressure using gas separators which ensure the liquid phase state. The effective flow conditioning prevents formation of the gas fraction in the flow, at that, it is regulated in such manner that the weighing by the Coriolis mass meter is provided with the uncertainty value close to repeatability.

In order to achieve minimal error of the whole fuel mass metering, it is necessary to minimize the determination error for each batch to sum. The required error reserve is made by the operational mode optimization for each mass meter using the flow conditioning. As a result, the expected instrumental error of each batch weighing approaches to the mass meter repeatability, about 0.07%-0.15% depending on the model.

The mass of each batch or medium portion subject to metering should exceed the "resolution capability" or "sensitivity" of the measuring system which is also called in the metrology as the minimum medium quantity which can be measured by this measuring device, or the minimum of the possible measured quantity, the minimum medium portion enough for measurement, etc. In other words, if any medium portion as a part of the sequential product supplied through the product metering line is less than its minimum possible measured quantity, so it cannot be included in summing up for metering. As a result, the whole metering operation for this RTC should be considered as the production fault due to discrepancy with the metrological requirements.

The stated instrumental minimum of the measured quantity in the system for the offered method is defined within 25 kg on the assumption that the fuel batches will be received in two or more stages with practical calculation for unloading and the mass metering within two hours provided by the corresponding standards used in the EU for tank unloading.

The important characteristic of the offered system is the option to direct the medium flow to B instrument line, as the interruptions in the operation of the A instrument line may be caused both by extreme decrease of the residual liquid in the tank when a significant amount of air is entering through the cone formed in the bottom medium remnants, by filter clogging, malfunction of the gas separator and by other reasons.

In this case, usage of the line with the low capacity not only ensures low absolute values of measurement error for each batch, but also enhances to the next level the probability of successful performance of metrological important measurement of the whole medium volume taken from the tank during its full unloading. Operating principle of the measuring line comprising two instrument lines: the line of the basic quantity (A) receipt from the tank (1) (loading function) with the large diameter and the line finishing the medium receipt (cleaning function) which has at least one order of magnitude smaller capacity; it allows to maintain the expected standard time of unloading while collecting the main cargo part (80-97%) by the cargo pump with the nominal capacity. Switching off the cargo pump helps to prevent the negative developments at the end of unloading active phase: formation of cones upon reaching of the low medium level and formation of the excessive bubbles in the pipelines.

Upon actuation of the stripping pump connected to the bottom of the system inner volume (9) (whereto the fuel remnants flow by gravity from the tank, connecting pipelines, gas separators, filters and from the inner cavities of the cargo line, etc.), it supplies the medium which is delivered by gravity and thus, which does not contain any gas bubbles, to the second instrument line which is characterized by low absolute error values and the smallest possible quantity of the measured medium.

The metering using the standard systems with the same purpose includes obtaining of the sum of the fuel portions between the failures (bubbles or filter clogging or other circumstances) interrupting the metering procedure which are known according to the readings of the instrument line devices or the secondary mass meter transducers. The standard system has only one single instrument line, i.e. it includes only one process solution applied in this case for the first instrument line which is used at the main stage of the system operation and offered in the present invention. Accordingly, the standard system is characterized by the high value of the minimum possible measured amount.

Thus, if upon measurement completion, about 5 kg of medium is left in the instrument line of the main stage due to its technological characteristics (in particular, diameter and length of the used pipeline sections), then the minimum possible measured quantity of this system is 2 tons (5 kg×400) according to the provided that the required measurement error should not exceed 0.25% and according to the ratio 100%/0.25%=400.

It means that if the continuous operation of the instrument line is interrupted buy any reason and, for example, 1.5 tons of medium is left in the tank, so it is not practical to resume the measurement using the instrument line of the main stage as the error of this batch will exceed 0.25%. Hence, it is impossible to meter all medium delivered from the tank but it is also impossible to return this medium from the already measured liquid. Practically, it means that the tank should first be emptied using manual measurements metering of its quantity with the error of 0.65%, and then it is necessary to activate the measuring system in the hope that the tank will be fully emptied and successfully measured with the error of 0.25%. Use of manual routines with engagement of personnel is unpractical.

Application of the offered solution which releases the cargo line from the medium residuals and performs measurements using the suggested method decreases significantly the minimum possible measured quantity for all measuring system.

In the suggested solution, 50 grams at most may be left in the second stripping line which gives 0.050 kg*400=20 kg according to the above mentioned formula. This minimum measured quantity allows to perform measurements of any liquid quantity exceeding 20-25 kg and to calculate it as the significant summand at calculation of the whole received cargo. The risks of production faults during the general metering and also violations of unloading time standards are greatly reduced due to greatly increased probability of proper measurement of all quantity received from the tank by means of summing up of all measured batches received via both instrument lines where each summand exceeds the minimum possible measured medium quantity and the sum forms the trustworthy result. This is especially important at metering of the fuel quantity received at unloading of RTCs and the road tank cars.

The procedure of measurements and equipment inspection does not require any new equipment as it is similar to the procedure used for the common filling metering system at fuel unloading, and, accordingly, the method described above can be used also for metering at filling. Uniformity of the measurement principles at receipt and issue of goods, application of similar calibration procedures unifies the calibration equipment and simplify operation and personnel training issues.

BRIEF DESCRIPTION OF THE DRAWINGS

Further, the solution is explained by the references to the figures whereon the following is given.

DETAILED DESCRIPTION

Figure 1:
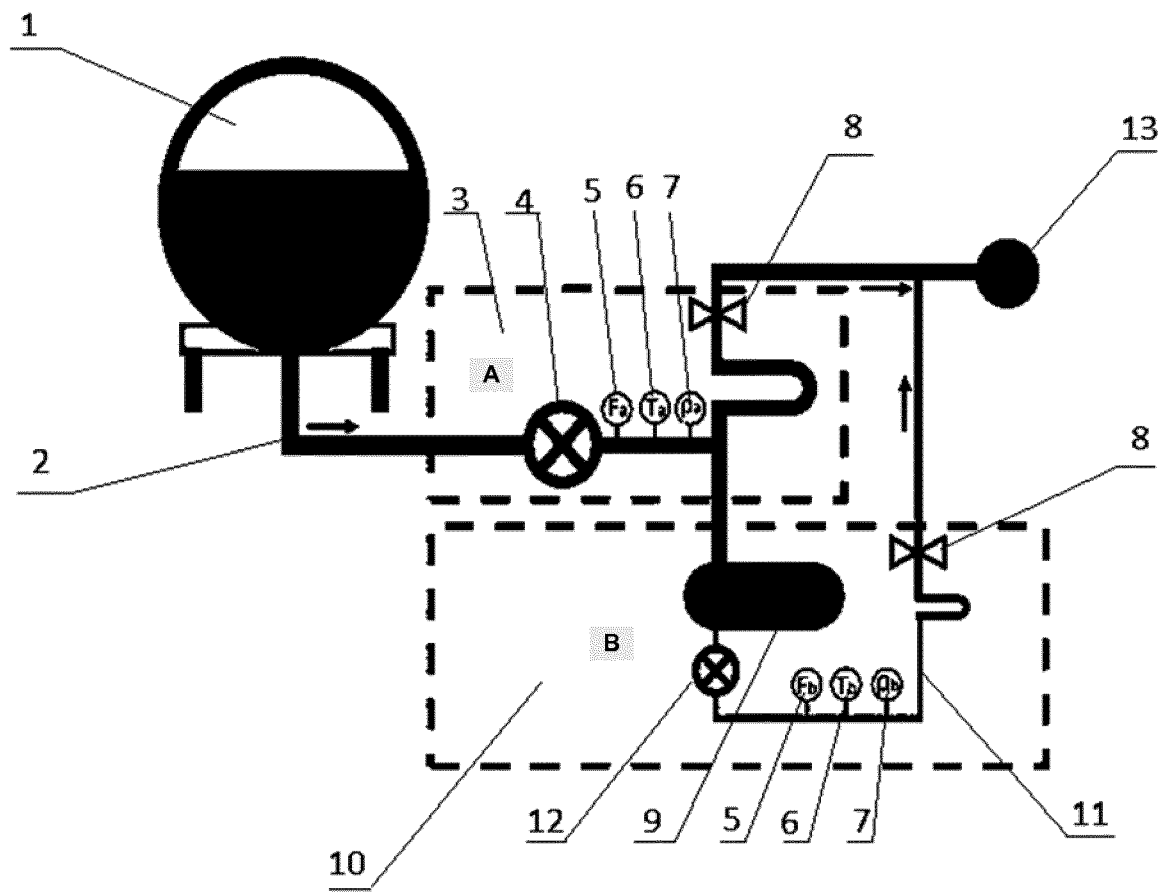
FIG. 1—Operation process scheme at the main stage, the parts of the system at A are active.
Figure 2:
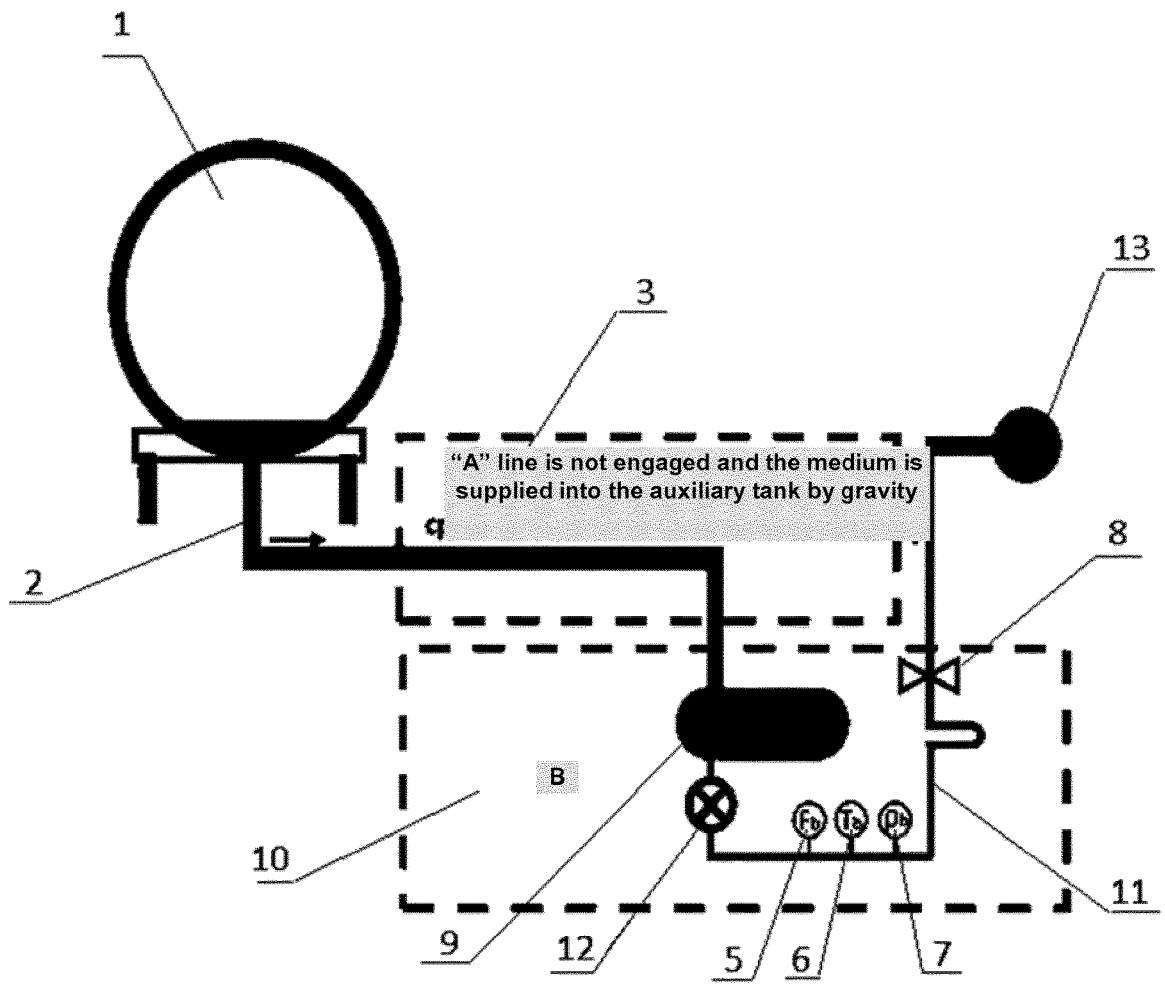
FIG. 2—Operation process scheme at the subsequent stage. The parts of the system B are active.

Before the invention is disclosed and described in detail, it is to be understood that this invention is not limited to particular configurations, process steps and materials disclosed herein as such configurations, process steps and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

All percentages are calculated by weight unless clearly indicated otherwise.

The discharge procedure is arranged in two cycles:

1. By the main pipe (2) and the components marked with "A" with a first diameter (the recommended parameters for the main pipeline 2: DN 50-125 mm (DN 2"-5") performing discharge and metering of 95-99.9% of cargo;

2. by the subsequent stage line (the components with "B" marking) with the subsequent pipeline 11 with a second diameter (the recommended parameters for the second pipeline 11: DN 6-20 mm (DN ¼"-⅘") with maintained stability having 50-100 less capacity and performing discharge and metering of the cargo residuals including the medium residuals in the tank upon completion of operation of the main pump 4 of the bottom discharge device (BDD) and discharge hoses, pipelines of the medium supply into the measurement system and the product residuals in the inner cavities of the measuring system.

Both instrument lines are equipped with the devices of the medium mass measurement in movement (in flow) 5, the devices calculating the measured medium in a proper manner and according to the accepted national procedure. Both lines are equipped with the sensors having the same operating principle which provide measurement of the temperature 6, pressure 7 and have the flow regulators 8. There are two flow regulators 8A and 8B. All volume of collected and measured medium is calculated by simple summing up of all measured medium portions. This is provided by the fact that the minimum possible measured quantity in the second line 10 is at least two orders smaller than the minimum possible measured quantity of the main (the first) line 3.

The operating sequence in one embodiment of the system under the normal conditions:

Upon receipt of the permit for beginning of medium discharge from the tank 1, the handling operator connects the discharge device with the connected measuring system to the tank and starts the pump 4 of the main system A. After the corresponding pressure is reached, the gate valve is automatically opened while the start time of metering of the product discharged through the mass meter is recorded. The required medium flow rate is maintained by the pump and the flow parameters ensuring the medium measurement process stability are provided by the pressure and flow rate regulator 8.

Thus, almost all medium volume is taken from the tank 1, and then the ACS sends the command to stop operation of the cargo pump 4 of the cargo (general) line.

At that, the main system finishes its work.

The finishing cycle system begins its operation: The gate valves at the pump suction 12 are automatically opened to discharge remnants from the equipment. The pump starts its operation and the remnants are metered by the mass meter with the smaller capacity.

The final cycle system performs collection and metering of remnants in one stage at least; after reaching of the number of product receipts set in the automated control system, the line and the whole system shut down the work upon the command of the automated control system.

If there is no liquid in the pipeline, after performing of all measurements, the signal is sent to the operator and to the control system to shut down the system and to switch it into the standby mode.

The ASC command for transfer from the main stage into the subsequent stage and also for finishing of the subsequent stage appears in the following cases:

At flow interruption registered by the probe readings corresponding to the empty pipeline at the pump suction of the corresponding line;

At readings of the currently operated mass meter corresponding to presence of gas and vapor bubbles in the medium above the limit;

If the diagnostic error of the load set-point for the corresponding mass meter appears.

There is the demand not to exceed the certain value of the current load on the exciting coil of the mass meter sensor of the main line specified by the ACS.

The ACS command to finish efforts of product receipts in the subsequent stage and, thus, to finish the product receipt process before the maximum number of receipts is performed, appears at combination of factors or when the set critical value for one of the above mentioned factors is exceeded. Then, the whole system switches automatically into the standby mode which lasts until connection of the next tank delivered for unloading and system actuation by the discharge and filling operator.

Oil product metering is performed in the mass units. Mass measuring by the direct dynamic method in the fully automated mode is the most common metering method at supply of B2B fuel. Thus, the most important of all requirements to the fuel metering system is the requirement to uniformity of the measurement methods. Operation of the mass meter at the end of RTC unloading may be interrupted; and, if any fuel part is being smaller than the minimum measured quantity, that is common for the traditional systems, so the mass measurement will be metrological unreliable. As a result, the whole metering operation for this RTC will be automatically rejected.

To obtain the measurements with the smallest error, the current load on the exciting coal of the mass meter sensor should not be too high. If this parameter exceeds the set-point in the ACS (for example, according to the value in the register of drug in 70%), it actuates the software application for optimization of pumping or transfer into the next subsequent mode. In any case, transfer from the main (A) into the subsequent mode (B) takes place if more than 95-99.9% of fuel supplied from RTC is collected.

IL mass meter of the subsequent mode B with the two order smaller capacity operates at all other similar parameters. At that, the smaller diameter of the pipeline 11 of the second instrument line 10 allows to perform measurements with the smallest error in the more flexible mode of operation, as the risk of gas bubble formation is low in such thin tubes.

In the subsequent mode, the medium flows to the bottom of the system inner volume (9) of the system from all process flow used in the main mode. It is performed the metering of all remnants supplied from the bottom residuals of the tank 1, discharge devices, filters, the gas separator, the pump, A line mass meter and all inner system cavities. At the subsequent stage, these remnants are pumped off from the bottom of the system inner volume (9) and properly metered.

Due to implementation of the described metering technology using the measurement scaling principle, the minimum possible measured quantity is reduced by two orders, thus, the reject probability is also reduced at full metering of the supplied medium at normal tank discharge provided that the industrial standards are met.

At the subsequent stage B, the channel of the dedicated density meter IL A is disconnected together with the mass meter A and then it operates in the mode of the instrument line B mass meter of the final cycle. The mass and density measurement channel are not duplicated in B cycle; the mass is small as compared with the full volume that is not significant for calculation of the total error for the whole metering operation.

Upon completion of the working cycle, the DPS performs the final calculation of the metered product. Then, the software application is actuated for automated transfer into the standby mode.

Metering of the total received fuel mass is determined by the system calculator by summing up of masses of all medium parts received at the main and subsequent stages.

For example, let's consider measurement of the medium mass in the tank with the capacity of 70 tons. Let us assume that the pump with the capacity of 80 m³/hour unloads the tank during one and half hour, the empirical main relative error of the first instrument line is 0.11%, it means that the absolute uncertainty value is 0.11 tons if the mass of 100 tons is measured.

Theoretically, the uncertainty value defined in favor of the customer may only standard one of 0.25% or 250 kg according to results of successful measurement of the whole product quantity at full tank discharge.

Let us suppose that it was necessary in fact to interrupt the product discharge and to stop measurement due to filter clogging by hygroscopic paraffin's ("frazil") when 1 ton of the medium was left in the cargo, i.e. in the first instrument line. In consideration of the foregoing, the standard measuring system which can measure 2 tons' minimum in this case, cannot be used further.

In the presented invention equipped by the second instrument line with the pump providing pumping of remnants with the capacity of 2.5 m³/hour and with the relative drift diameter which is 8 times smaller, with the same relative error of 0.11%, the two-line integrated system allows to perform measurements of:

At first, only the remnants with the same empirical error of 1.1 kg (0.0011 tons). Even if the filter is clogged repeatedly, the liquid phase will be fully collected and measured in several stages (the number of stages affects duration of unloading; stripping of 1 ton of remnants takes 20 minutes), and all batches will be counted which exceed the value of 20 kg (0.002 tons) according to the reduced volume. The value of 20-25 kg is the minimum possible measured quantity of the second line which is calculated by multiplying of irreducible medium remnants with the mass of 0.05 kg by the ratio of 100%:0.25%=400 (ratio of the standard allowable error of 0.25% to the batch volume taken as 100%). In turn, the maximum mass of 0.05 kg, adopted for this calculation for the irreducible medium remnants in the system, takes into account the medium in the inner capacity of the pipeline in the second stripping line with the volume of V=0.00004 m³ provided that DN is 10 mm and the pipeline length of this line is L=0.6 m.

Second, the absolute error of the second line gives the small error of not more than 2.5 kg per ton of remnants provided that the total allowable error for all 70 tons in the tank should not exceed 175 kg, and this last value determines the error of the whole system;

Third, given that almost all volume is pumped out during 1 hour at the main stage, and the remnants with the mass which is conditionally taken here as 1 ton are pumped out during 25-35 minutes more even considering resuming of filter operation, so even if the filters are clogged more than once, the system capacity will allow to fit in 2 hours which are usually allocated for such unloading.

It is noteworthy that the medium is fully discharged from the system due to the gravity, and all medium is measured by collection from the bottom of the system inner volume (9). Herewith, such important metrological characteristic as minimum possible measured quantity is determined by the second system, and its error in absolute terms, if all other things being equal, is proportional to the squared ratio of the first line pipeline section to the second line section. In the special case of the above mentioned example of the system, the ratio is 175:2.5=70:1, i.e. the minimum possible measured quantity is almost two order less while DN80 and DN10 differ by only an order from each other.

Please note, that exceedance of the minimum measured quantity at the measurement is one of the specifying conditions making the batch measurement cycle accomplished with the standard error and also it is the condition of summing up of these results for calculation of the whole mass received from the tank.

The "bottom of the system inner volume" (9) can be viewed as an "auxiliary tank" (9). This part 9 is schematically depicted in the drawings as a volume 9 below the A-line. This is the bottom part of the inner volume of the system.

It is implicit that the system comprises valves as necessary in order to regulate the flow as intended and to switch between the different modes. Further various sensors in addition to the described sensors may be added.

Actually, 63 tons of gasoline is filled in the RTC. At unloading by the traditional systems (only the first line), the first bubble may appear in the cone, for example, after discharge of 59 tons, if system control by one instrument line with DN80 does not manage to control the flow, or the filter is clogged and the measurement is interrupted. In this case, it is possible to restart this system, as the rest 4 tons do not exceed yet the minimum possible measured quantity of 2 tons. But, at repeated fault, the remnant will be less than 2 tons in half cases at normal probability distribution, i.e. it already cannot be measured by this line. As a result, if measurement of one batch is rejected, all sum of the fuel batches received form one tank should be considered as uncounted.

It is impossible to pump back the same fuel quantity from the manifold 13 into the tanks, as the medium supplies into the input manifold 13 irretrievably.

In the suggested system, this problem is solved by the second line which has much less minimum measured quantity and can measure the above mentioned rest 3 tons with the error which is significantly lower than in the current systems.

Thus, the most important thing is that we decrease the minimum possible measured quantity by two orders and decrease the risk of rejected measurement by two orders.

As a result, we turn from measurement in "meters" to measurement in "centimeters" and this determines the invention practical importance.

First of all, this leads to the increased safety of the discharge railroad overpass operation, as the number of personnel hours of staff presence in the dangerous area decreases significantly by means of suggested automation of the metering operations each are performed manually anywhere now. At that, the suggested system is different from other systems because it fully removes fuel from the area of the personnel presence, which is the essential factor of facility safety.

Secondarily, usage of the suggested systems allows to reach quite another safety level of the fuel unloading automated high-accuracy systems, as the number of the rejected measurements is reduced almost by two orders as compared with the present technical level.

In general, the suggested logic of system construction with two lines with different functions and capacities will result in wide implementation of safe, reliable and precision systems with high availability and readiness on site.

The invention claimed is:

1. A method of measuring a liquid medium with low pressure of saturated vapors when pumped out of a tank (1), said method comprising at least one main stage and at least one subsequent stage, wherein each of the at least one main stage is followed by a one of the at least one subsequent stage; the main stage comprises using a first line pump (4) to pump out the liquid medium from the tank (1) and in a first instrument line (Fa, Ta, ρa) equipped with a mass meter with a first flow rate range, the subsequent stage is initiated by the first line pump (4) being stopped, whereby the method enters the subsequent stage, during the subsequent stage remnants of the liquid medium are collected from the tank (1) and inner cavities of the first instrument line (Fa, Ta, ρa) into a bottom of a system inner volume (9) by gravity; and from a bottom point of the bottom of the system inner volume (9), the liquid medium is supplied by a second pump (12) into a second instrument line (Fb, Tb, ρb) equipped with a mass meter, a mass measuring capacity of the second instrument line (Fb, Tb, ρb) is at least one order of magnitude less than that of the first instrument line (Fa, Ta, ρa), when the number of performed main stages and subsequent stages reaches a predefined value or another condition is met, a measurement result is calculated by summing all medium masses from all main stages and subsequent stages, the method further comprising giving a command to enter the subsequent stage and also to finish the next subsequent stage is given when filter clogging is determined by exceeded limits of a differential pressure sensor at a filter.

2. The method of measuring a liquid medium of claim 1, characterized in that the liquid medium drains into the bottom of the system inner volume (9) from the tank (1), and from the first instrument line (Fa, Ta, ρa) wherein pipes supply the liquid medium to the second pump (12).

3. The method of measuring a liquid medium of claim 1, characterized in that the remnants supplied from the tank (1) bottom, discharge devices, filters, from a gas separator bottom, from pumps (4, 12), the first instrument line (Fa, Ta, ρa) and internal system cavities are discharged into the bottom of the system inner volume (9), pumped out and metered in the subsequent stage.

4. The method of measuring a liquid medium of claim 1, characterized in that a discharge is performed through a bottom discharge device of the tank (1) or a tank bottom point.

5. The method of measuring a liquid medium of claim 1, characterized in that a flow is conditioned during pumping out by a main (2) and/or a subsequent line (11) using a standard control valve for flow conditioning by a medium back pressure.

6. The method of measuring a liquid medium of claim 1, characterized in that a flow is conditioned during pumping out by a main (2) and/or a subsequent instrument line (11) using treatment of flow of the liquid medium under pressure by gas separators which maintain a liquid phase state.

7. The method of measuring a liquid medium of claim 1, characterized in that Coriolis flow rate meters are used, wherein the Coriolis flow rate meter for the subsequent stage has at least one order of magnitude less capacity than a capacity of a flow rate used at the main stage.

8. The method of measuring a liquid medium of claim 1, characterized in that main and subsequent instrument lines perform pumping out and measurement of a medium quantity unknown in advance in a fully automated mode.

9. The method of measuring a liquid medium of claim 1, characterized in that main and subsequent instrument lines perform pumping out of a metered product quantity as determined by on operator.

10. The method of measuring a liquid medium according to claim 1, wherein the second instrument line (Fb, Tb, ρb), has a mass-measuring capacity which is at least two orders of magnitude less than that of the first instrument line (Fa, Ta, ρa).

11. The method of measuring a liquid medium of claim 1, wherein the method is implemented in an automatic control system, ACS, adapted to control a device where the method is performed.

12. The method of measuring a liquid medium of claim 11, characterized in that a flow is conditioned and all mass meters are kept operated in a mode selected according to rated values of a used mass meter type corresponding to a lowest measurement error during pumping.

13. The method of measuring a liquid medium of claim 1, characterized in that a command to enter the subsequent stage and also to finish the next subsequent stage is given when an interruption of liquid flow is registered by probe readings corresponding to an empty pipeline at a pump suction of a corresponding line.

14. The method of measuring a liquid medium according to claim 13 characterized in that a flow rate meter used at the main and subsequent stages is at least one selected from the group consisting of a Coriolis, an ultrasonic, a fluidic, a turbine, a direct volume displacement and a magnetic displacement flow meter, wherein, the flow rate meter for the subsequent stage has at least one order of magnitude less capacity than a capacity of the flow rate meter used at the main stage.

15. A method of measuring a liquid medium with low pressure of saturated vapors when pumped out of a tank (1), said method comprising at least one main stage and at least one subsequent stage, wherein each of the at least one main stage is followed by a one of the at least one subsequent stage; the main stage comprises using a first line pump (4) to pump out the liquid medium from the tank (1) and in a first instrument line (Fa, Ta, ρa) equipped with a mass meter with a first flow rate range, the subsequent stage is initiated by the first line pump (4) being stopped, whereby the method enters the subsequent stage, during the subsequent stage remnants of the liquid medium are collected from the tank (1) and inner cavities of the first instrument line (Fa, Ta, ρa) into a bottom of a system inner volume (9) by gravity; and from a bottom point of the bottom of the system inner volume (9), the liquid medium is supplied by a second pump (12) into a second instrument line (Fb, Tb, ρb) equipped with a mass meter, a mass measuring capacity of the second instrument line (Fb, Tb, ρb) is at least one order of magnitude less than that of the first instrument line (Fa, Ta, ρa), when the number of performed main stages and subsequent stages reaches a predefined value or another condition is met, a measurement result is calculated by summing all medium masses from all main stages and subsequent stages, the method further comprising giving a command to enter the subsequent stage and also to finish the next subsequent stage when currently active mass meter readings correspond to a level of bubbles in the liquid medium above a predefined value.

16. A method of measuring a liquid medium with low pressure of saturated vapors when pumped out of a tank (1), said method comprising at least one main stage and at least one subsequent stage, wherein each of the at least one main stage is followed by a one of the at least one subsequent stage; the main stage comprises using a first line pump (4) to pump out the liquid medium from the tank (1) and in a first instrument line (Fa, Ta, ρa) equipped with a mass meter with a first flow rate range, the subsequent stage is initiated by the first line pump (4) being stopped, whereby the method enters the subsequent stage, during the subsequent stage remnants of the liquid medium are collected from the tank (1) and inner cavities of the first instrument line (Fa, Ta, ρa) into a bottom of a system inner volume (9) by gravity; and from a bottom point of the bottom of the system inner volume (9), the liquid medium is supplied by a second pump (12) into a second instrument line (Fb, Tb, ρb) equipped with a mass meter, a mass measuring capacity of the second instrument line (Fb, Tb, ρb) is at least one order of magnitude less than that of the first instrument line (Fa, Ta, ρa), when the number of performed main stages and subsequent stages reaches a predefined value or another condition is met, a measurement result is calculated by summing all medium masses from all main stages and subsequent stages, the method further comprising at least on of the following: a) giving a command to enter the subsequent stage and also to finish the next subsequent stage if a diagnostic error occurs in any of the first or second instrument lines or b) determining a command to enter the subsequent stage by a requirement not to exceed a certain value of a current load on an excitation coil of a mass meter sensor of the first instrument line.

17. The method of measuring a liquid medium of claim 16, wherein the method is implemented in an automatic control system, ACS, adapted to control a device where the method is performed.

18. The method of measuring a liquid medium of claim 16, characterized in that a command to enter the subsequent stage and also to finish the next subsequent stage is given when an interruption of liquid flow is registered by probe readings corresponding to an empty pipeline at a pump suction of a corresponding line.

19. The method of measuring a liquid medium of claim 16, characterized in that the liquid medium drains into the bottom of the system inner volume (9) from the tank (1), and from the first instrument line (Fa, Ta, ρa) wherein pipes supply the liquid medium to the second pump (12).

20. The method of measuring a liquid medium of claim 16, characterized in that the remnants supplied from the tank (1) bottom, discharge devices, filters, from a gas separator bottom, from pumps (4, 12), the first instrument line (Fa, Ta, ρa) and internal system cavities are discharged into the bottom of the system inner volume (9), pumped out and metered in the subsequent stage.

* * * * *